(12) United States Patent
Murphy et al.

(10) Patent No.: US 6,590,748 B2
(45) Date of Patent: Jul. 8, 2003

(54) COMBINED SERVO-TRACKING AND PRELOAD-CONTROLLING MICROACTUATOR

(75) Inventors: James M. Murphy, Boulder, CO (US);
David A. Sluzewski, Edina, MN (US);
John S. Wright, Edina, MN (US);
David G. Qualey, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 75 days.

(21) Appl. No.: 09/876,463

(22) Filed: Jun. 7, 2001

(65) Prior Publication Data

US 2001/0050833 A1 Dec. 13, 2001

(51) Int. Cl.$^7$ .............................. G11B 5/56; G11B 21/24
(52) U.S. Cl. .................................... 360/294.4
(58) Field of Search ......................... 360/294.4, 294.3, 360/294.1, 244.2, 244.3, 244.4, 292, 291.9

(56) References Cited

U.S. PATENT DOCUMENTS

| | | | | |
|---|---|---|---|---|
| 4,080,636 A | * | 3/1978 | Ravizza | 360/77.16 |
| 4,099,211 A | * | 7/1978 | Hathaway | 360/292 |
| 4,233,637 A | * | 11/1980 | Kubota | 386/74 |
| 4,374,402 A | * | 2/1983 | Blessom et al. | 360/266.2 |
| 4,868,447 A | * | 9/1989 | Lee et al. | 310/328 |
| 5,170,089 A | * | 12/1992 | Fulton | 310/328 |
| 5,521,779 A | | 5/1996 | Arakawa et al. | 360/108 |
| 5,719,720 A | | 2/1998 | Lee | 360/71 |
| 6,362,542 B1 | * | 3/2002 | Novotny | 310/12 |

* cited by examiner

Primary Examiner—A. J. Heinz
Assistant Examiner—Angel Castro
(74) Attorney, Agent, or Firm—Westman, Champlin & Kelly (57) ABSTRACT

A dual-acting disc drive micro-actuator is formed of a stack of adjoining layers. The stack includes first through fifth layers. The first layer includes first and second spaced apart top electrodes. The second layer includes a first piezoelectric element electrically coupled to the first and second top electrodes. The third layer includes a center electrode electrically coupled to the first piezoelectric element. The fourth layer includes a second piezoelectric element electrically coupled to the center electrode. The fifth layer includes a first bottom electrode electrically coupled to the second piezoelectric element. The first and second piezoelectric elements are expandable and contractible in a common length direction in response to respective electrical fields applied between the center electrode and the first top electrode, the second top electrode and the first bottom electrode.

24 Claims, 8 Drawing Sheets

Fig. 15

COMBINED SERVO-TRACKING AND PRELOAD-CONTROLLING MICROACTUATOR

FIELD OF THE INVENTION

The present invention relates to disc drive data storage systems and, more particularly, to the use of microactuators in disc drive head positioning apparatus.

BACKGROUND OF THE INVENTION

Disc drive data storage systems use rigid discs which are coated with a magnetizable medium for storage of digital information in a plurality of circular, concentric data tracks. The discs are mounted on a spindle motor which causes the discs to spin and the surfaces of the discs to pass under respective disc head sliders. The sliders carry transducers which write information to and read information from the disc surfaces. The slider and transducer are often together referred to as a "head". Each slider is supported by an actuator arm and a suspension. The actuator arms move the sliders from track-to-track across the surfaces of the discs under the control of electronic control circuitry for track following operations.

The suspension connects the actuator arm to the slider. The suspension provides a preload force through a relatively rigid load beam which forces the slider toward the disc surface. Additionally, the suspension is flexible in the slider pitch and roll directions to allow the slider to follow the topography of the disc. This pitch and roll flexibility is obtained from a gimbal or flexure structure, which can be integral with the load beam or a separate piece part that is welded or otherwise attached to the load beam.

The slider includes a hydrodynamic (e.g., air) bearing surface, which faces the disc surface. As the disc rotates, the disc drags air under the slider and along the bearing surface. As the air passes beneath the bearing surface, air compression along the air flow path causes the air pressure between the disc and the bearing surface to increase, which creates a hydrodynamic lifting force that counteracts the load force and causes the slider to fly above or in close proximity to the disc surface. It is desirable to maintain a substantially constant flying height during read and write operations.

Two major mechanical challenges facing the designers of disc drives include accurate servo track following operations in disc drives having ultra high track densities and limiting flying height variations during different operating conditions and between different sliders, especially in disc drives having ultra-low fly heights. Disc drive manufacturers are nearing the limits of their ability to ensure close track-following with conventional single-stage actuators, such as actuators employing voice coil motors. This is due to structural resonances and disturbances present in the disc drive. One method of dealing with these structural resonances and disturbances is through the use of a second stage "microactuator", which is located closer to the transducer than the voice coil motor and thereby excludes many of the structural resonances between the microactuator and the voice coil motor. Performance, manufacturability and cost are three main challenges in implementing microactuators.

With respect to limiting variations in flying heights, currently flying heights are entering the nanometer range. Any factors causing variations in the flying heights of sliders are therefore becoming more significant and difficult to control. Excessive flying height variation, both for a given head under different operating conditions and for the population of heads manufactured, can confound the ability of the disc drive to read and write properly.

The present invention provides a solution to this and other problems and offers other advantages over the prior art.

SUMMARY OF THE INVENTION

One embodiment of the present invention relates to a dual-acting disc drive microactuator formed of a stack of adjoining layers, which includes first through fifth layers. The first layer includes first and second spaced apart top electrodes. The second layer includes a first piezoelectric element electrically coupled to the first and second top electrodes. The third layer includes a center electrode electrically coupled to the first piezoelectric element. The fourth layer includes a second piezoelectric element electrically coupled to the center electrode. The fifth layer includes a first bottom electrode electrically coupled to the second piezoelectric element. The first and second piezoelectric elements are expandable and contractible in a common length direction in response to respective electrical fields applied between the center electrode and the first top electrode, the second top electrode and the first bottom electrode.

Another embodiment of the present invention relates to a disc drive suspension having a longitudinal axis, a transverse axis and an elongated stack of adjoining layers, which extends along the longitudinal axis and includes first through fifth layers. The first layer includes first and second coplanar top electrodes which are separated from one another along the transverse axis. The second layer includes a first piezoelectric element which is electrically coupled to the first and second top electrodes. The third layer includes a center electrode which is electrically coupled to the first piezoelectric element. The fourth layer includes a second piezoelectric element electrically coupled to the center electrode. The fifth layer includes a first bottom electrode electrically coupled to the second piezoelectric element. The first and second piezoelectric elements are expandable and contractible along the longitudinal axis in response to respective electrical fields applied between the center electrode and the first top electrode, the second top electrode and the first bottom electrode.

Another embodiment of the present invention relates to a disc drive including a disc, which is rotatable about a central axis, and a suspension for carrying a transducer relative to the disc. The suspension has a dual-acting piezoelectric bimorph element which deforms a section of the suspension in a cross-track direction and in a vertical direction relative to the disc in response to electric fields applied to the bimorph element.

These and various other features as well as advantages which characterize the present invention will be apparent upon reading the following detailed description and review of the associated drawings.

DETAILED DESCRIPTION OF ILLUSTRATIVE EMBODIMENTS

Figure 1:
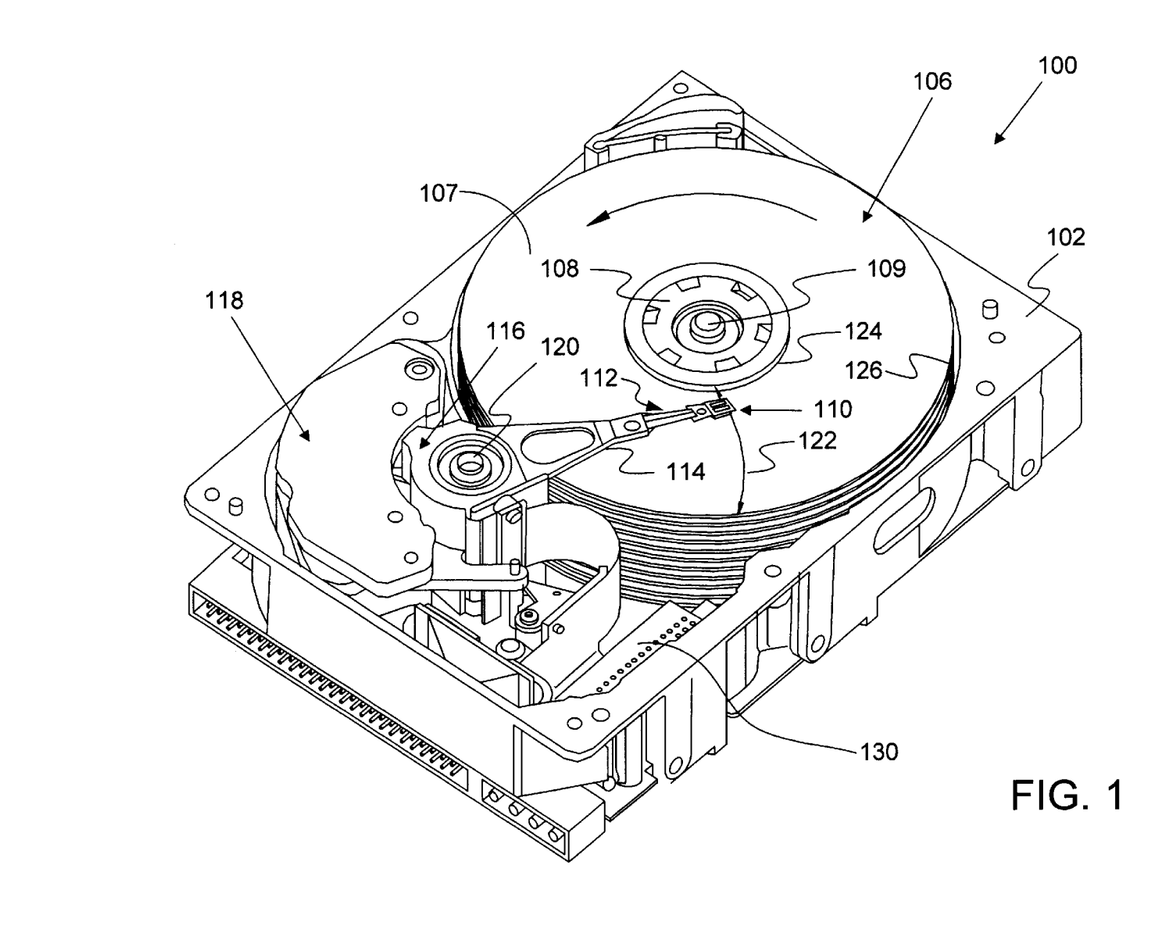
FIG. 1 is a perspective view of a disc drive in which the present invention is useful.

FIG. 1 is a perspective view of a disc drive 100 in which the present invention is useful. Disc drive 100 can be configured as a magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms (or "actuator arms") 114. Track accessing arms 112 are radially positioned by a first-stage actuator 116. Actuator 16 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of servo control circuitry 130. Other types of first-stage actuators can also be used, such as linear actuators.

According to one embodiment of the present invention, each suspension 112 includes a second-stage "microactuator" for finely positioning slider 110 over the desired data track and for simultaneously controlling a preload force supplied to slider 110 by suspension 112. In one embodiment of the present invention, suspension 112 incorporates a multi-layer piezoelectric bimorph that is electrically connected such that it can actuate in both the cross-track direction along path 122 for servo track following and in a "Z-direction" normal to the disc surface to adjust the preload force and hence, the flying height of slider 110. Actuation in the cross-track and Z-directions are controlled by control voltages supplied by servo control circuitry 130.

Figure 2:
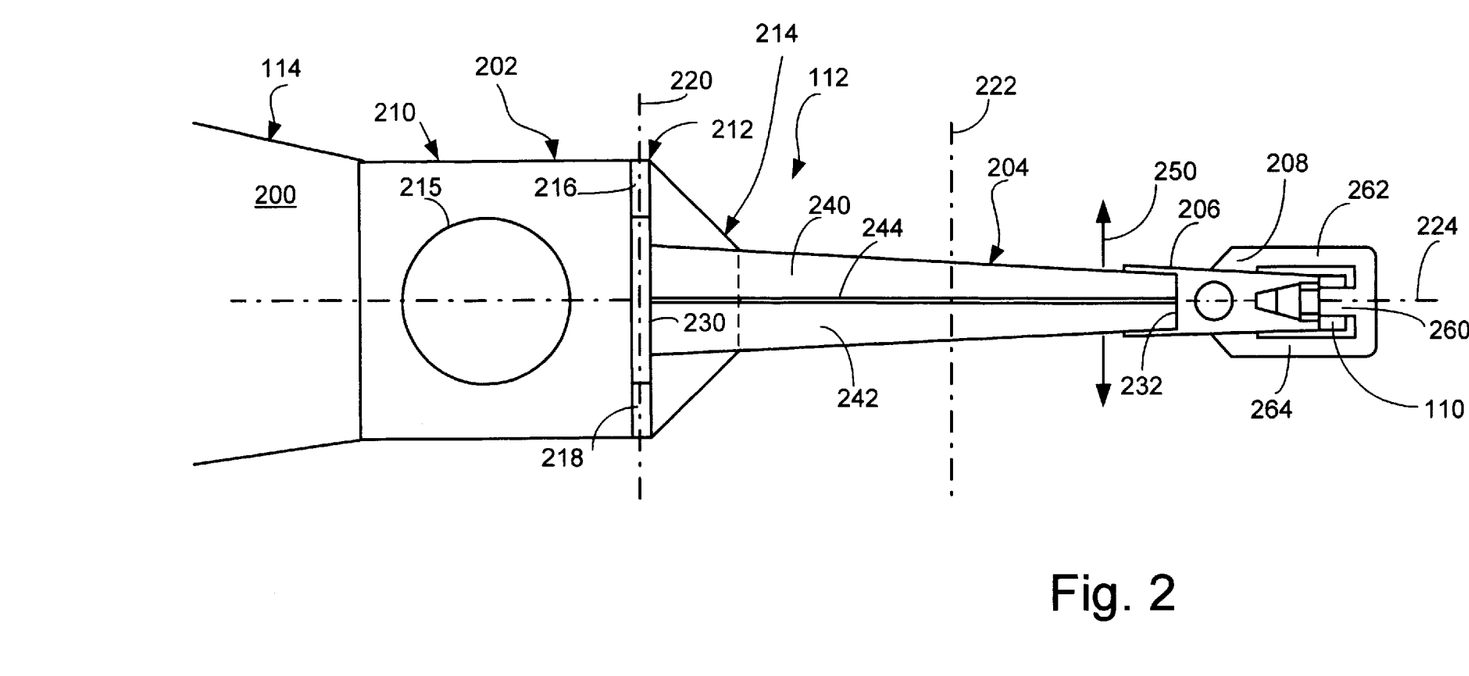
FIG. 2 is a top plan view of an actuator arm and suspension in the disc drive shown in FIG. 1, according to one embodiment of the present invention.

FIG. 2 is a top plan view illustrating suspension 112 and track accessing arm 114 in greater detail. Track accessing arm 114 has a distal end 200, which supports suspension 112. Suspension 112 includes a base section 202, an elongated microactuator beam section 204, a slider support section 206, and a flexure 208. Base section 202 is similar to the proximal end of a traditional suspension, and is formed of a sheet of stainless steel, for example, which has been stamped or etched to define its features. Base section 202 includes a proximal mounting section 210, a flexible beam section 212 and a microactuator mounting section 214. Proximal mounting section 210 is attached to distal end 200 of track accessing arm 114. Proximal mounting section 210 can be attached by any of a variety of well-known methods, such as by ball staking through aperture 215. Flexible beam section 212 includes beams 216 and 218, which extend from proximal mounting section 210 to microactuator mounting section 214. Beams 216 and 218 each include a preload bend having an axis of curvature 220 which is parallel to a transverse axis 222 of suspension 112 and perpendicular to a longitudinal axis 224 of suspension 212. As is well known in the art, such a preload bend creates a preload force in suspension 112 that is transmitted by the suspension to slider 110. Microactuator mounting section 214 extends distally from flexible beam section 212 and provides a surface on which to attach microactuator beam section 204.

Microactuator beam section 204 has a proximal end 230 attached to microactuator mounting section 214 and a distal end 232 attached to slider support element 206. Microactuator beam section 204 can be attached to microactuator mounting section 214 and slider support element 206 by any method, such as with an adhesive. As described in more detail below with reference to FIG. 3, microactuator beam section 204 includes an elongated stack of adjoining layers, which forms a dual-acting, multi-layer piezoelectric bimorph that is capable of deflecting distal end 232 relative to proximal end 230 in a cross-track direction 250 and simultaneously in a vertical, "Z-direction" (normal to the disc surface). Deflection in the cross-track direction 250 allows for accurate servo track-following operations, and deflection in the Z-direction allows adjustment of the preload force applied to slider 110 and thus the flying height of slider 110 over the disc surface. These deflections are made under the control of control voltages generated by servo control circuitry 130 (shown in FIG. 1). The first, top layer of microactuator beam section 204 includes a pair of co-planar top electrodes 240 and 242, which are separated from one another along longitudinal axis 224 by an electrical isolation gap 244. Electrodes 240 and 242 are electrically coupled to respective control voltage outputs of servo control circuitry 130.

Slider support element 206 extends distally from distal end 232 of microactuator beam section 204 and transmits the preload force to the back surface of slider 110. In one embodiment, the outside edges of slider support element 206 further include stiffening rails (not shown), which are bent out-of-plane with the main surface of section 206 for assisting in the transmission of the preload force to the back surface of slider 110. Such stiffening rails are common in load beams of the prior art.

Flexure 208 can be a separate piece part which is attached to slider support element 206 or can be integrated with element 206 as a single, continuous piece of material. In one embodiment, flexure 208 is welded to the bottom surface of element 206. Flexure 208 has a central tab 260, which is adhered to the back surface of slider 110, and has a pair of flexure beams 262 and 264, which allow slider 110 to pitch and roll while following the topography of the disc surface. In an alternative embodiment, distal end 232 of microactuator beam section 204 is attached directly to flexure 208, with no slider support element 206.

Figure 3:
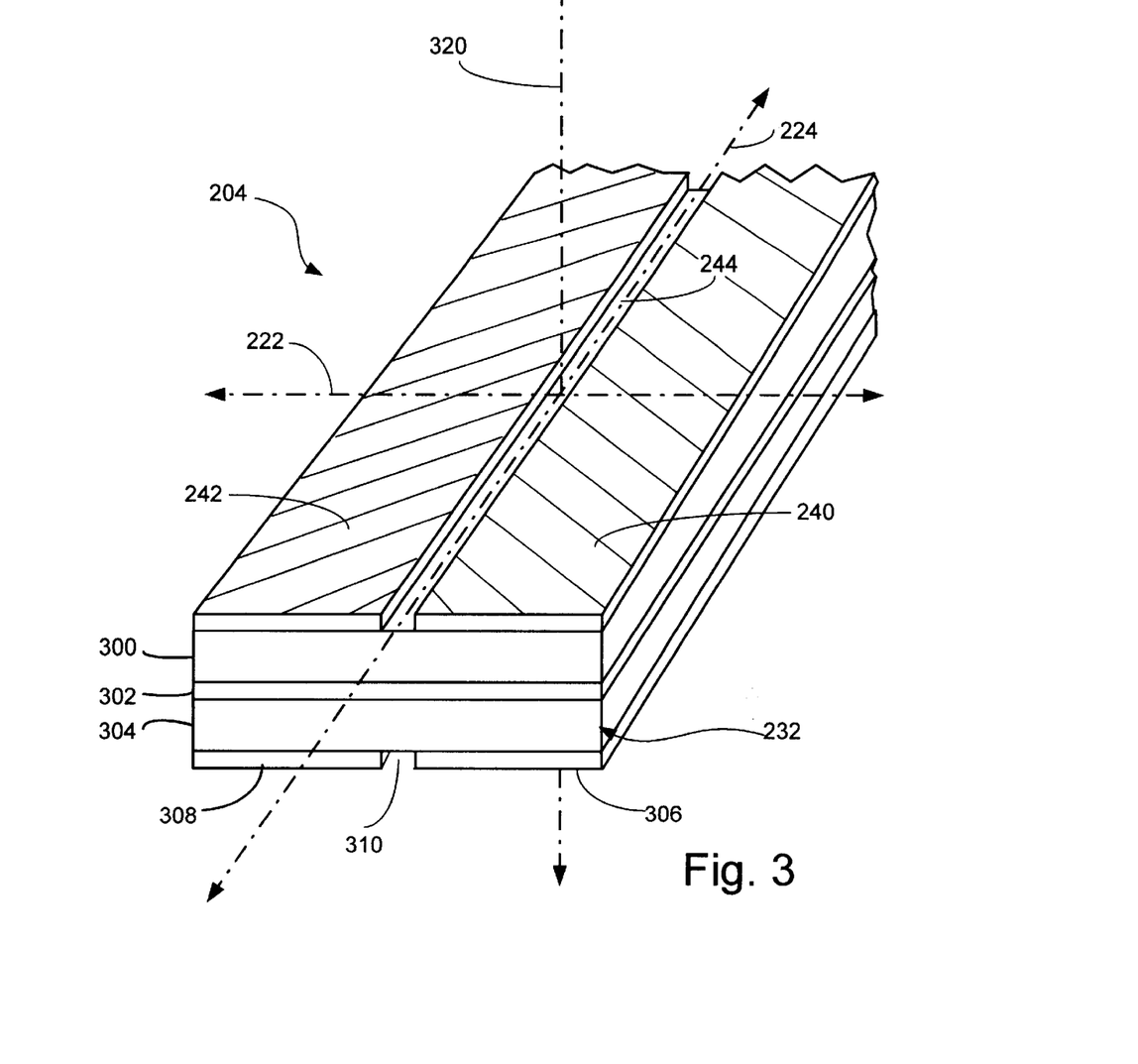
FIG. 3 is a perspective view of a microactuator beam section within the suspension shown in FIG. 2, as viewed from its distal end.

FIG. 3 is a perspective view of microactuator beam section 204, as viewed from distal end 232. Microactuator beam section 204 is formed of a stack of adjoining layers. The first layer includes co-planar top electrodes 240 and 242, which are separated by electrical isolation gap 244 along transverse axis 222. The second layer includes piezoelectric element 300, which is electrically coupled to electrodes 240 and 242 in the first layer. Piezoelectric element 300 can include a single piezoelectric layer or multiple piezoelectric layers. The third layer includes a center electrode 302, which is electrically coupled to piezoelectric element 300. Center electrode 302 can serve as a ground electrode, for example. The fourth layer includes piezoelectric element 304, which is electrically coupled to center electrode 302. Again, piezoelectric element 304 can include a single piezoelectric layer or multiple piezoelectric layers. The fifth layer includes a pair of co-planar bottom electrodes 306 and 308 which are electrically coupled to piezoelectric layer 304. Bottom electrodes 306 and 308 extend along longitudinal axis 224 similar to top electrodes 240 and 242, and are separated from one another along longitudinal axis 224 by an electrical isolation gap 310. Gaps 244 and 310 can be free of material or can be filled with any suitable material having a high dielectric constant.

The embodiment shown in FIG. 3 essentially forms a two-layer piezoelectric bimorph with separate electrical terminals on the left and right sides of microactuator beam section 204 and on the top and bottom of beam section 204. As discussed in more detail below, this allows simultaneous deflection in the cross-track and vertical directions. Such a two-layer piezoelectric bimorph can be readily manufactured by methods well know to those skilled in the art.

Center electrode 302 is a continuous electrically conducting layer extending through the center of the stack. Center electrode 302 is electrically coupled to ground, and the top and bottom electrodes 240, 242, 306 and 308 are driven in selected pairs differentially with respect to ground. Top electrodes 240 and 242 and bottom electrodes 306 and 308 are driven by individual control voltages generated by electrical control circuitry 130 (shown in FIG. 1). When the left and right hand sides are held at opposite potentials, for example with electrodes 240 and 306 being held at opposite potentials than electrodes 242 and 308, one side of the bimorph expands along longitudinal axis 224 while the other side contracts along longitudinal axis 224. This causes the bimorph to curve along axis 224 deflect distal end 232 relative to proximal end 230. When top electrodes 240 and 242 are held at opposite potentials than bottom electrodes 306 and 308, this causes an expansion of one of the piezoelectric elements 300 and 304 and a contraction of the other piezoelectric element. Distal end 232 therefore deflects in a vertical direction along Z-axis 320, which results in a change in the preload force supplied to the back surface of slider 110 (shown in FIGS. 1 and 2).

Figure 4:
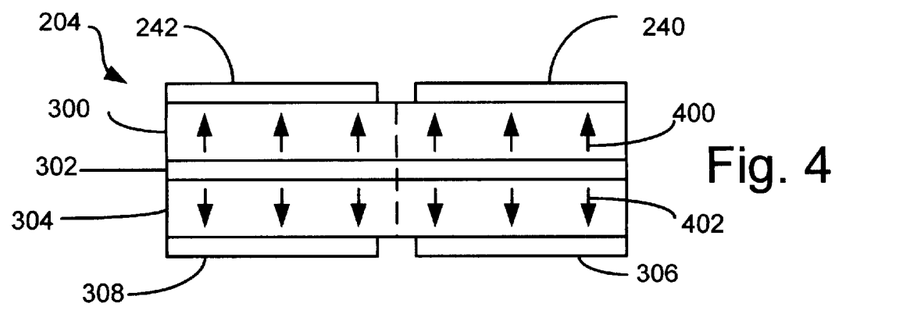
FIG. 4 is an end view of the microactuator beam section shown in FIG. 3, which illustrates the relative poling directions of piezoelectric elements within the microactuator beam section.

FIG. 4 is an end view of microactuator beam section 204, which illustrates the relative poling directions of piezoelectric elements 300 and 304. Arrows 400 and 402 represent the poling or bias directions of piezoelectric elements 300 and 304, respectively. Poling direction 400 of piezoelectric element 304 is opposite to the poling direction 402 of piezoelectric element 304, relative to center electrode 302.

The poling directions of piezoelectric elements 300 and 304 are established during the fabrication of the piezoelectric domains.

Figure 5:
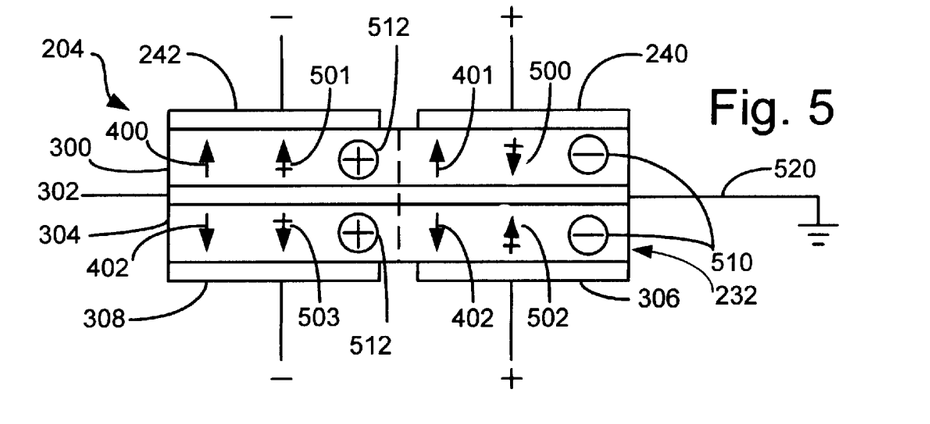
FIG. 5 is an end view of the microactuator beam section, which illustrates electrical biasing that produces a cross-track deflection of the distal end.

FIG. 5 is an end view of microactuator beam section 204, which illustrates the biasing of electrodes 240, 242, 306 and 308 to produce a cross-track deflection of distal end 232. Center electrode 302 is coupled to ground terminal 520. Top electrode 240 and bottom electrode 306 are biased positively with respect to ground terminal 520, and top electrode 242 and bottom electrode 308 are biased negatively with respect to ground terminal 520. Arrows 500–503 represent the electric field directions in the right-hand and left-hand sides of piezoelectric elements 300 and 304. Since the right-hand sides of piezoelectric elements of 300 and 304 are biased with electric field directions 500 and 502 that are opposite to poling directions 400 and 402, the right-hand sides of piezoelectric elements 300 and 304 contract along longitudinal axis 224 (shown in FIG. 3). Symbol 510 represents a piezoelectric contraction in a direction into the page. Since the left-hand side of piezoelectric elements 300 and 304 are biased with electrical field directions that are aligned with poling directions 400 and 402, the left-hand side of elements 300 and 304 expand in a direction out of the page, as indicated by symbol 512. Since the right-hand side contracts while the left-hand side expands, distal end 232 deflects to the right in FIG. 5.

Figure 6:
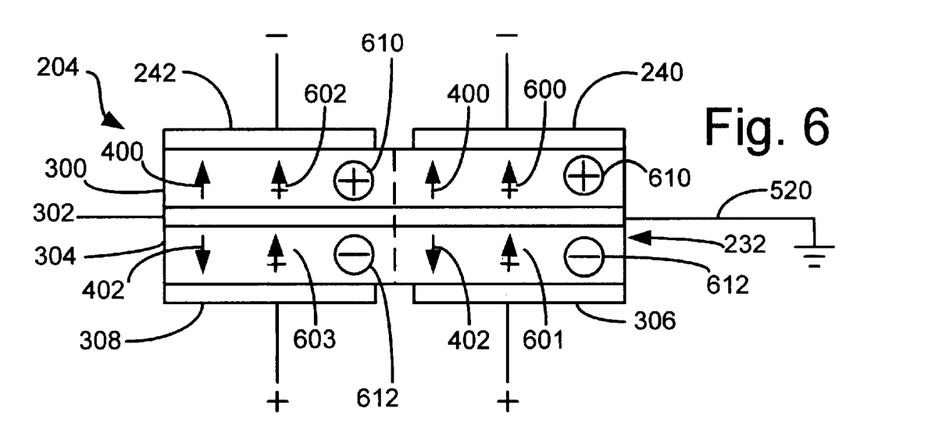
FIG. 6 is an end view of the microactuator beam section, which illustrates electrical biasing that produces a vertical deflection of the distal end.

FIG. 6 is an end view of microactuator beam element 204, which illustrates the biasing of electrodes 240, 242, 306 and 308 to produce a change in the preload force applied to the slider. Electrodes 240 and 242 are biased negatively with respect to center electrode 302, and electrodes 306 and 304 are biased positively with respect to center electrode 302. As a result, the electric field directions 600 and 602 in piezoelectric layer 300 are aligned with the poling direction 400 of piezoelectric element 300 causing an expansion in both sides of element 300, as indicated by symbols 610. The electric field directions 601 and 603 in piezoelectric layer 304 are oriented opposite to the poling direction 402 of piezoelectric element 304 causing a contraction in both sides of element 304, as indicated by symbols 612. Expansion of piezoelectric element 300 and contraction of piezoelectric element 304 cause a downward defection of distal end 232 of microactuator beam section 204, which increases the preload force supplied to slider 110.

In one illustrative embodiment, microactuator beam section 204 is 10 centimeters (cm) long and tapers from 2 cm in width at proximal end 230 (shown in FIG. 2) to 1 cm in width at distal end 232 (also shown in FIG. 2). Piezoelectric elements 300 and 304 each have a thickness along Z-axis 320 of about 4 mils. In this example, a ±24 volt command voltage would produce a ±15 micrometer ($\mu$m) deflection in the cross-track direction (i.e., 650 nm/V) and a ±76 $\mu$m deflection along Z-axis 320 (i.e., 3.2 $\mu$m/V). When used in conjunction with a stiff beam section 212 having a spring rate of 100 gf/inch, a ±76 $\mu$m out-of-plane motion would produce a ±0.3 gram-force (gf) change in preload force. This change is sufficient to offset most of any remaining variation in the preload force from one drive to the next (or one suspension to the next) following manufacture and assembly of the drive. For example, the remaining preload variation may be approximately ±0.4 gf following any drive-level preload adjustments. In this example, the final variation in the preload force (after adjustment by the microactuator) would be about ±0.1 gf. In alternative embodiments, different lengths and thicknesses of the elements can be used. Also, microactuator beam section 204 can have a constant width along transverse axis 222 from proximal end 230 to distal end 232.

By a proper selection of the polarity and magnitude of the control voltage applied to each of the top an bottom electrodes, microactuator beam section 204 can simultaneously adjust the cross-track position of slider 110 and the preload force applied to the slider. This allows fine-tuning for servo-track following operations and active control of the slider flying height. Excessive fly-height variation for a given head under different operating conditions and for a population of manufactured heads can therefore be limited while allowing the servo control system to position the slider accurately in drives having ultra high track densities.

Figure 7:
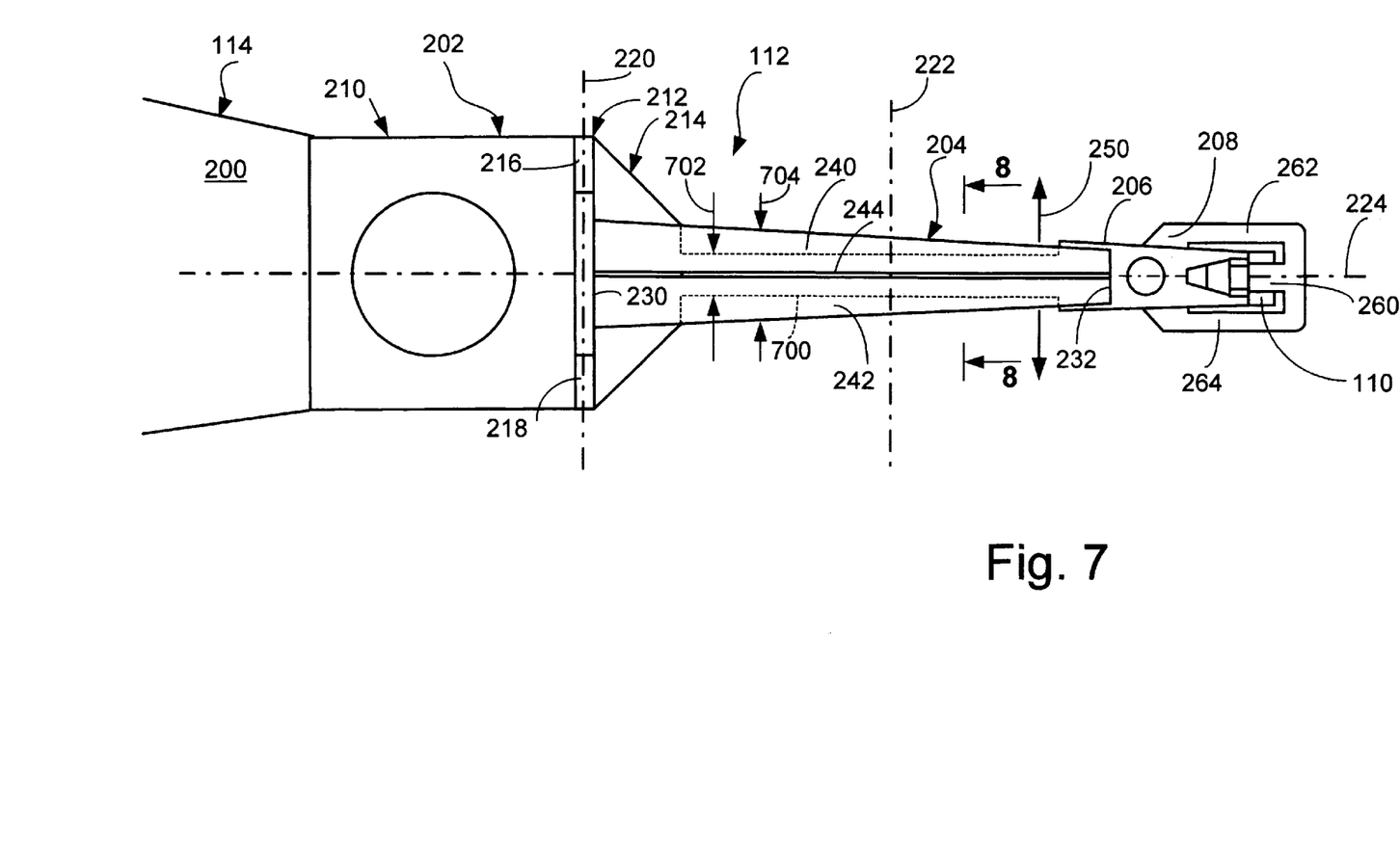
FIG. 7 is a top plan view of a suspension and track accessing arm according to an alternative embodiment of the present invention in which the microactuator beam section is supported by a stiff suspension beam.

FIG. 7 is a top plan view of suspension 112 and track accessing arm 114 according to an alternative embodiment of the present invention. The same reference numerals are used in FIG. 7 as were used in FIG. 2 for the same or similar elements. In this embodiment, suspension 112 further includes an elongated stiff suspension beam 700 (shown in phantom), which extends from microactuator mounting section 214 of base section 202 to slider support element 206. Suspension beam 700 is formed with base section 202 and slider support element 206 as a single, continuous piece of material which can be metallic or non-metallic. Suspension beam 700 extends along microactuator beam section 204 to provide additional tensile strength in the direction of along transverse axis 222. In one embodiment, suspension beam 700 has a width 702 which is less than the width 704 of microactuator beam section 204. This allows suspension beam 700 to provide additional stiffness while still allowing microactuator beam section 204 to deflect distal end 232 along transverse axis 222. Suspension beam 700 is substantially planar across its entire width 702.

Figure 8:
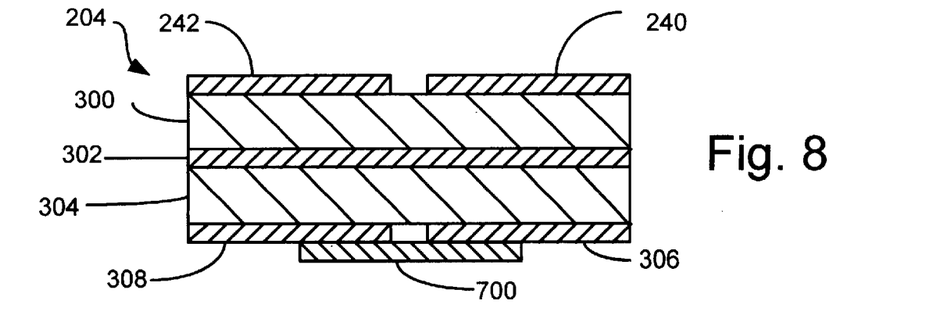
FIG. 8 is a cross-sectional view of the suspension taken along lines 8—8 of FIG. 7.

FIG. 8 is a cross-sectional view of microactuator beam section 204 taken along lines 8—8 of FIG. 7. Suspension beam 700 is attached to the lower surfaces of bottom electrodes 306 and 308 (or alternatively to the upper surfaces of top electrodes 240 and 242) and is centered with respect to the lateral side edges of microactuator beam section 204. Suspension beam 700 is electrically isolated from bottom electrodes 306 and 308 by an appropriate dielectric layer (not shown). In alternative embodiments, suspension beam 700 can be attached to or between any one of the layers in microactuator beam section 204.

Figure 9:
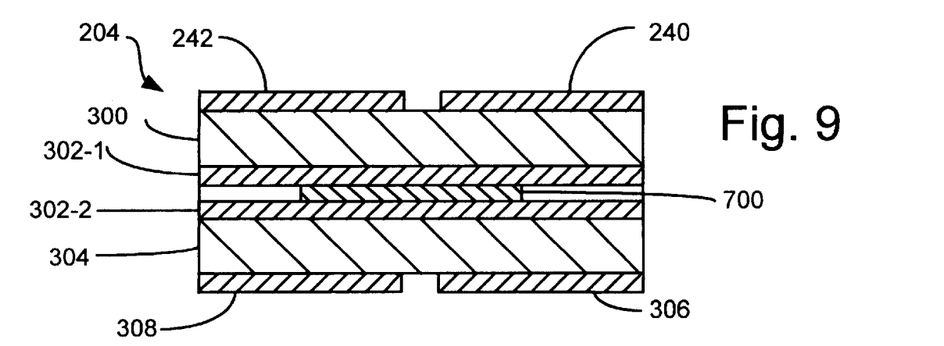
FIG. 9 is a cross-sectional view of a microactuator beam section, which has two center electrodes according to an alternative embodiment of the present invention.

For example, FIG. 9 is a cross-sectional view of microactuator beam section 204 according to another alternative embodiment of the present invention. In this embodiment, center electrode 304 includes a first center electrode 302-1 and a second center electrode 302-2. Suspension beam 700 is positioned between center electrodes 302-1 and 302-2. The remaining spaces between center electrodes 302-1 and 302-2 can be filled with a dielectric material, for example. Since center electrodes 302-1 and 302-2 are at the same electrical potential, suspension beam 700 can form an electrical connection between the two center electrodes such that suspension beam 700 forms a ground layer.

Figure 10:
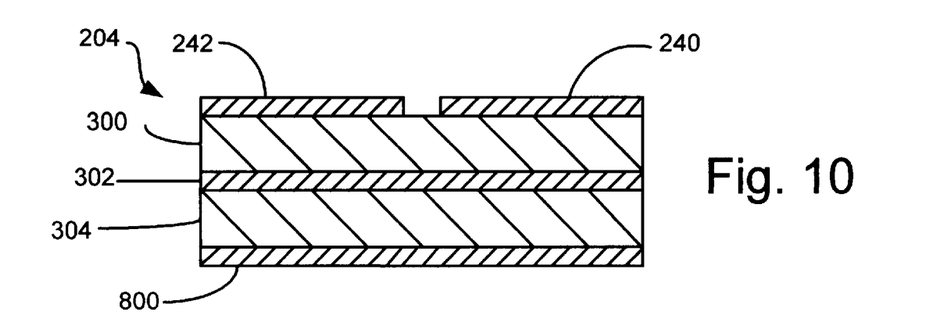
FIG. 10 is a cross-sectional view of a microactuator beam section, which has a single bottom electrode according to an alternative embodiment of the present invention.

FIG. 10 is a cross-section view of microactuator beam section 204 according to another alternative embodiment of the present invention. Again, the same reference numerals are used in FIG. 10 as were used in FIGS. 1–2 for the same or similar elements. In this embodiment, bottom electrodes 306 and 308 are combined as a single bottom electrode 800. This embodiment provides the same change in preload force as in the embodiment shown in FIGS. 1–2, but produces roughly half of the cross-track stroke since only the top piezoelectric element 300 is used for producing a cross-track deflection. In another embodiment, top electrodes 240 and 242 are combined as a single top electrode, and two bottom electrodes 306 and 308 are used to produce cross-track deflection.

Figure 11:
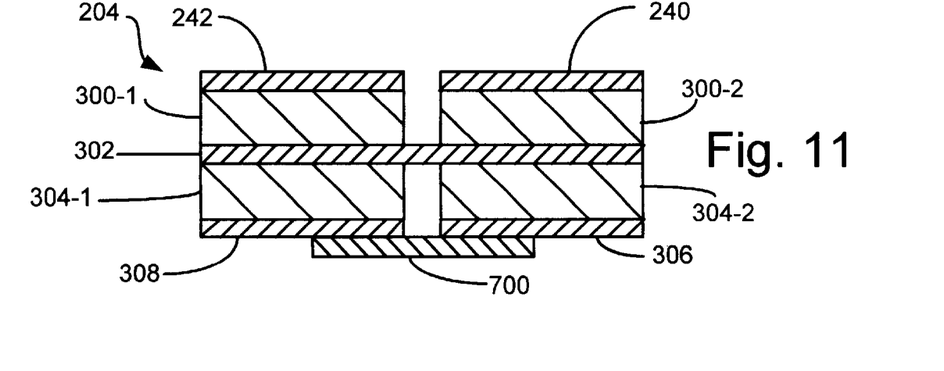
FIG. 11 is a cross-sectional view of a microactuator beam section, which two pairs of elongated piezoelectric beams according to an alternative embodiment of the present invention.

FIG. 11 is a cross-sectional view of microactuator beam section 204 according to another alternative embodiment of the present invention. In this embodiment, piezoelectric elements 300 and 304 are each divided into separate left and right side beams 300-1, 300-2, 304-1 and 304-2, respectively. Each of these beams runs the entire length of microactuator beam section 204, along longitudinal axis 224. Suspension beam 700 can be used to add additional stiffness and structural integrity, if needed.

Figure 12:
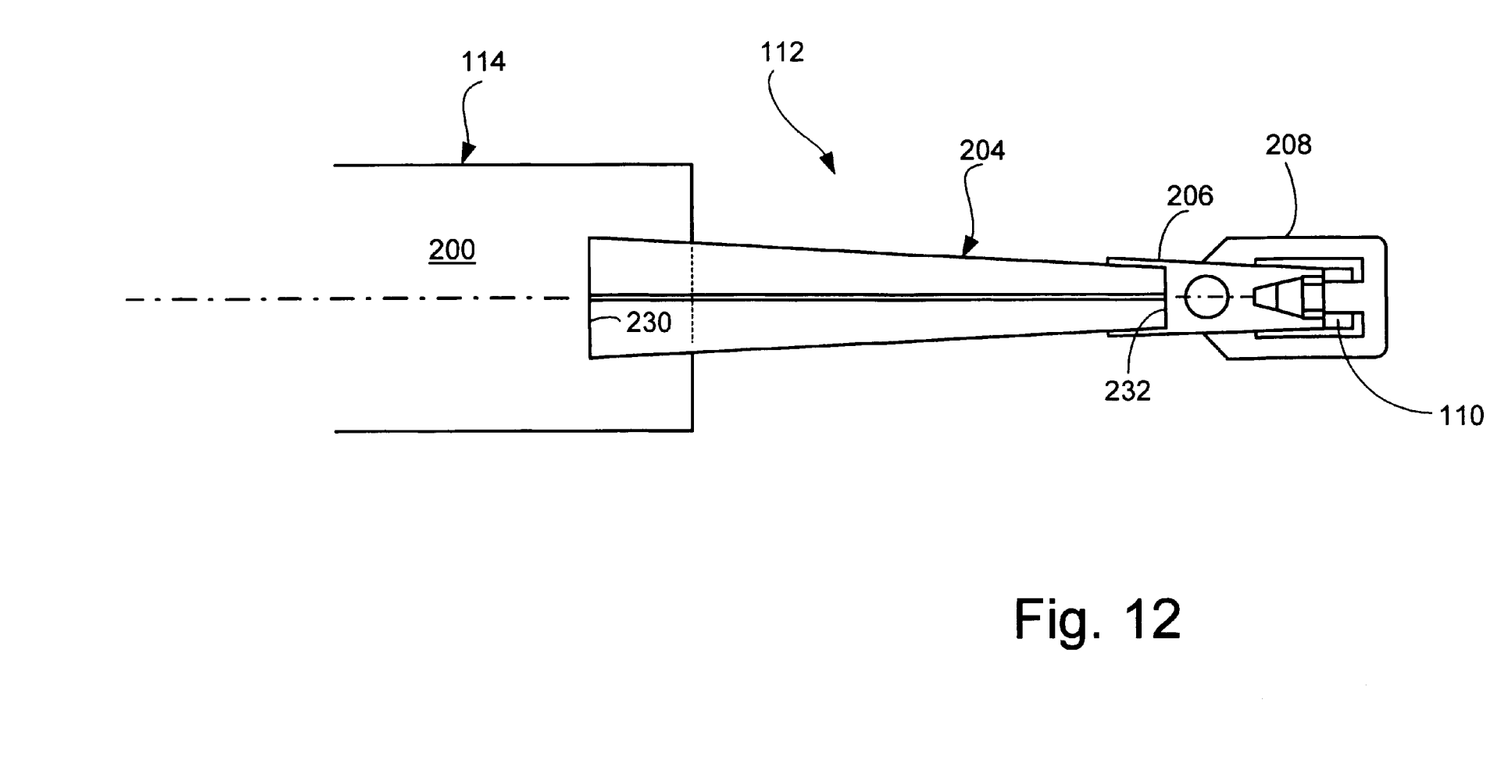
FIG. 12 is a top plan view of a suspension and a track accessing arm according to another alternative embodiment of the present invention.

FIG. 12 is a top plan view of suspension 112 and track accessing arm 114 according to another alternative embodiment of the present invention. Again, the same reference numerals are used in FIG. 12 as were used in FIGS. 1 and 2 for the same or similar elements. In this embodiment, the proximal end 230 of microactuator beam section 204 is attached directly to distal end 200 of track accessing arm 114. This attachment can be made through an adhesive, for example. Any other suitable means of attachment can also be used.

Figure 13:
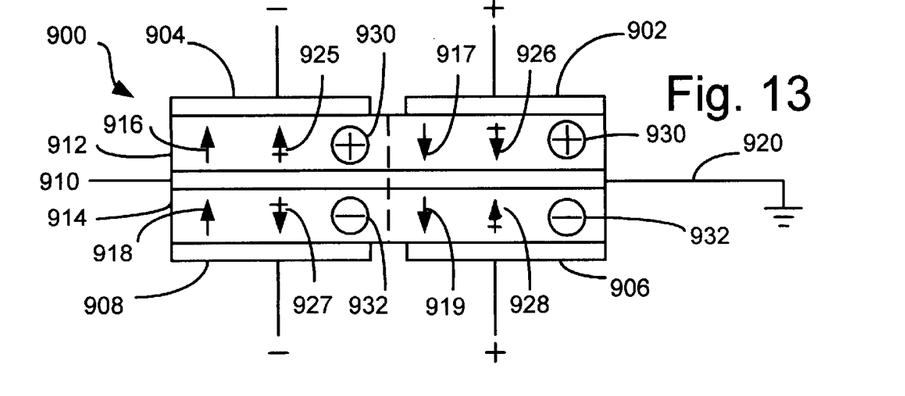
FIGS. 13 and 14 are end views of a microactuator beam section according to another alternative embodiment of the present invention in which the top and bottom piezoelectric elements have the same relative poling directions.
Figure 14:
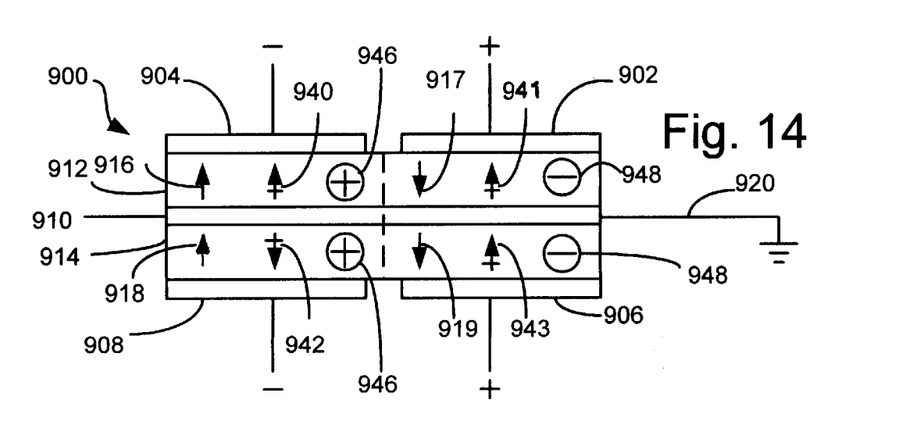

FIGS. 13 and 14 are end views of a microactuator beam section 900 according to another alternative embodiment of the present invention in which the top and bottom piezoelectric elements have the same relative poling directions. Beam section 900 has top electrodes 902 and 904, bottom electrodes 906 and 908, center electrode 910 and top and bottom piezoelectric elements 912 and 914. Arrows 916–919 represent the poling or bias directions of piezoelectric elements 912 and 914. The left-hand sides of elements 912 and 914 have upwards poling directions 916 and 918, and the right-hand sides of elements 912 and 914 have downwards poling directions 917 and 919.

In FIG. 13, piezoelectric elements 912 and 914 are electrically biased to produce a change in the preload force applied to the slider. Center electrode 912 is coupled to ground terminal 920. Top electrode 902 and bottom electrode 906 are electrically biased positively with respect to ground terminal 920, and top electrode 904 and bottom electrode 908 are biased negatively with respect to ground terminal 920. Arrows 925–928 represent the electric field directions in the right-hand and left-hand sides of piezoelectric elements 912 and 914. The electric field directions 925 and 926 in piezoelectric layer 912 are aligned with the poling directions 916 and 917 of piezoelectric element 912 causing an expansion in both sides of element 912, as indicated by symbols 930. The electric field directions 927 and 928 in piezoelectric layer 914 are oriented opposite to poling directions 918 and 919 of piezoelectric element 914 causing a contraction in both sides of element 918, as indicated by symbols 932. Expansion of piezoelectric element 912 and contraction of piezoelectric element 914 cause a downward defection of the distal end of microactuator beam section 900, which increases the preload force supplied to the slider.

In FIG. 14, piezoelectric elements 912 and 914 are electrically biased to produce a cross-track deflection in the distal end of microactuator beam section 900. Arrows 940–944 represent the electric field directions applied to the left and right-hand sides of elements 912 and 914, respectively. The left-hand sides of piezoelectric elements of 912 and 914 are biased with electric field directions 940 and 942 that aligned with poling directions 916 and 918. Thus, the left-hand sides of piezoelectric elements 912 and 914 expand along the longitudinal axis of microactuator beam section 900, as indicated by symbols 946. Since the right-hand side of piezoelectric elements 912 and 914 are electrically biased oppositely to poling directions 917 and 919, the right-hand sides of elements 912 and 914 contract along the longitudinal axis of section 900, as indicated by symbols 948. Since the right-hand side contracts while the left-hand side expands, the distal end of microactuator beam section 900 deflects to the right in FIG. 14.

Figure 15:
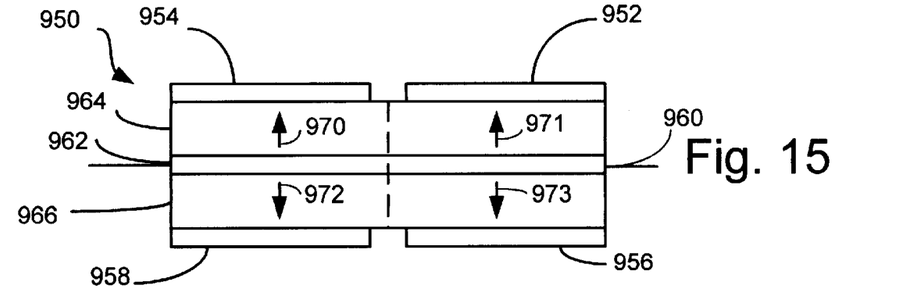
FIG. 15 is an end view of a microactuator beam section according to another alternative embodiment of the present invention, which provides flexibility in poling directions and electrical biasing of the left and right-hand sides of the piezoelectric elements.

FIG. 15 is an end view of a microactuator beam section 950 according to another alternative embodiment of the present invention, which provides the greatest flexibility in poling directions and electrical biasing of the left and right-hand sides of the piezoelectric elements. Microactuator beam section 950 has top electrodes 952 and 954, bottom electrodes 956 and 958, two independent center electrodes 960 and 962, and top and bottom piezoelectric elements 964 and 966. Center electrodes 960 and 962 are electrically isolated from one another, and can be electrically coupled to the same or opposite potentials. The poling directions of the left and right-hand sides of elements 964 and 966 can be oriented independently in upwards or downwards directions. For example, all poling directions can be oriented upwards as shown by arrows 970–973. Alternatively, the poling directions can be oriented in a variety of relative other directions, such as those shown in FIGS. 4–6 and 13–14. Also, all poling directions can be oriented downwards. Cross-track and preload deflections can be obtained by separately controlling the expansion and contraction of each left, right, top and bottom quadrant of piezoelectric elements 964 and 966.

In summary, one embodiment of the present invention relates to a dual-acting disc drive microactuator (such as 204, 900, 950) formed of a stack of adjoining layers, which includes first through fifth layers. The first layer includes first and second spaced apart top electrodes (such as 240 and 242, 902 and 904, and 952 and 954). The second layer includes a first piezoelectric element (such as 300, 300-1, 300-2, 912, 964) electrically coupled to the first and second top electrodes (such as 240 and 242, 902 and 904, and 952 and 954). The third layer includes a center electrode (such as 302, 302-1, 302-2, 910, 960, 962) electrically coupled to the first piezoelectric element (such as 300, 300-1, 300-2, 912, 964). The fourth layer includes a second piezoelectric element (such as 304, 304-1, 304-2, 914, 966) electrically coupled to the center electrode (such as 302, 302-1, 302-2, 910, 960, 962). The fifth layer includes a first bottom electrode (such as 306, 308, 800, 906, 908, 956, 958) electrically coupled to the second piezoelectric element (such as 304, 304-1, 304-2, 914, 966). The first and second piezoelectric elements (such as 300, 300-1, 300-2, 304, 304-1, 304-2, 912, 914, 964, 966) are expandable and contractible in a common length direction (such as 224) in response to respective electrical fields (such as 500–503, 600–603, 925–928, 940–944) applied between the center electrode (such as 302, 302-1, 302-2, 910, 960, 962) and the first top electrode (such as 240, 902, 952), the second top electrode (such as 242, 904, 954) and the first bottom electrode (such as 306, 308, 800, 906, 908, 956, 958).

Another embodiment of the present invention relates to a disc drive suspension (such as 112) having a longitudinal axis (such as 224), a transverse axis (such as 222) and an elongated stack of adjoining layers (such as 204, 900, 950) which extends along the longitudinal axis (such as 224) and includes first through fifth layers. The first layer includes first and second coplanar top electrodes (such as 240, 242, 902 and 904, and 952 and 954) which are separated from one another along the transverse axis (such as 222). The second layer includes a first piezoelectric element (such as 300, 300-1, 300-2, 912, 964) which is electrically coupled to the first and second top electrodes (such as 240, 242, 902 and 904, and 952 and 954). The third layer includes a center electrode (such as 302, 302-1, 302-2, 910, 960, 962) which is electrically coupled to the first piezoelectric element (such as 300, 300-1, 300-2, 912, 964). The fourth layer includes a second piezoelectric element (such as 304, 304-1, 304-2, 914, 966) electrically coupled to the center electrode (such as 302, 302-1, 302-2, 910, 960, 962). The fifth layer includes a first bottom electrode (such as 306, 308, 800, 906, 908, 956, 958) electrically coupled to the second piezoelectric element (such as 304, 304-1, 304-2, 914, 966). The first and second piezoelectric elements (such as 300, 300-1, 300-2, 304, 304-1, 304-2, 912, 964, 914, 966) are expandable and contractible along the longitudinal axis (such as 224) in response to respective electrical fields (such as 500–503, 600–603, 925–928, 940–943) applied between the center electrode (such as 302, 302-1, 302-2, 910, 960, 962) and the first top electrode (such as 240, 902, 952), the second top electrode (such as 242, 904, 954), and the first bottom electrode (such as 306, 308, 800, 906, 908, 956, 958).

Another embodiment of the present invention relates to a disc drive (such as 100) including a disc (such as 107), which is rotatable about a central axis (such as 109), and a suspension (such as 112) for carrying a transducer relative to the disc (such as 107). The suspension (such as 112) has a dual-acting piezoelectric bimorph element (such as 204, 900, 950) which deforms a section of the suspension (such as 112) in a cross-track direction (such as 250) and in a vertical direction (such as 320) relative to the disc (such as 107) in response to electric fields (such as 500–503, 600–603, 925–928, 940–943) applied to the bimorph element (such as 204, 900, 950).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the actuator while maintaining substantially the same functionality without departing from the scope and spirit of the present invention. The terms "top", "bottom", "left" and "right" used in the written description and the claims are interchangeable with one another. In addition, although the embodiments described herein are directed to a microactuator positioned within the suspension, it will be appreciated by those skilled in the art that the macroactuator can be positioned at any location along the track accessing arm or the suspension, without departing from the scope and spirit of the present invention. Many other alternative embodiments are also envisioned.

What is claimed is:

1. A dual-acting disc drive microactuator formed of a stack of adjoining layers comprising:
   a first layer comprising first and second spaced apart top electrodes;
   a second layer comprising a first piezoelectric element electrically coupled to the first and second top electrodes;
   a third layer comprising a center electrode electrically coupled to the first piezoelectric element;
   a fourth layer comprising a second piezoelectric element electrically coupled to the center electrode;
   a fifth layer comprising a first bottom electrode electrically coupled to the second piezoelectric element, wherein the first and second piezoelectric elements are expandable and contractible in a common length direction in response to respective electric fields applied between the center electrode and the first and second top electrodes and between the center electrode and the first bottom electrode; and
   a suspension beam which extends along the stack, is elongated with the stack of adjoining layers in the length direction and is attached to at least one of the first through fifth layers in the stack, wherein the first and second piezoelectric elements have widths measured in a width direction that is perpendicular to the length direction and parallel to the first through fifth layers, and wherein the suspension beam has a width measured in the width direction that is less than the widths of the first and second piezoelectric elements.

2. The dual-acting disc drive microactuator of claim 1 wherein:
   the first and second top electrodes, the center electrode and the bottom electrode are elongated in the length direction; and
   the first and second top electrodes are coplanar with one another in the first layer and are separated from one another by an electrical isolation gap in a width direction, which is perpendicular to the length direction and parallel to the first and second top electrodes.

3. The dual-acting disc drive microactuator of claim 2 wherein the stack of adjoining layers has first and second opposite ends and wherein the second end is movable relative to the first end in the width direction in response to the respective electric fields applied between the center electrode and the first top electrode and between the center electrode and the second top electrode.

4. The dual-acting disc drive microactuator of claim 2 wherein the stack of adjoining layers has first and second opposite ends and wherein the second end is movable relative to the first end in a vertical direction, which is perpendicular to the length and width directions, in response to the respective electric fields applied between the center electrode and at least one of the first and second top electrodes and between the center electrode and the first bottom electrode.

5. The dual-acting disc drive microactuator of claim 1 wherein the fifth layer further comprises:
   a second bottom electrode electrically coupled to the second piezoelectric element and coplanar with the first bottom electrode within the fifth layer, wherein the first and second bottom electrodes are separated from one another by an electrical isolation gap in a width direction, which is perpendicular to the length direction and parallel to the first and second bottom electrodes.

6. The dual-acting disc drive microactuator of claim 1 wherein the center electrode comprises:
   first and second center electrodes which are coplanar with one another within the third layer and are separated from one another by an electrical isolation gap in a width direction, which is perpendicular to the length direction and parallel to the first and second center electrodes.

7. The dual-acting disc drive microactuator of claim 1 wherein:
   the center electrode comprises a first center electrode electrically coupled to the first piezoelectric element, a second center electrode electrically coupled to the second piezoelectric element and parallel to the first center electrode; and
   the suspension beam is positioned between the first and second center electrodes.

8. The dual-acting disc drive microactuator of claim 1 wherein the first and second piezoelectric elements are each multi-layer piezoelectric elements.

9. The dual-acting disc drive microactuator of claim 1 wherein the first piezoelectric element comprises:
   first and second elongated piezoelectric beams that are separated from one another in a width direction, which is perpendicular to the length direction and parallel to the first and second top electrodes, wherein the first top electrode is electrically coupled to the first piezoelectric beam and the second top electrode is electrically coupled to the second piezoelectric beam.

10. A disc drive suspension comprising:
   a longitudinal axis and a transverse axis;
   an elongated stack of adjoining layers, which extends along the longitudinal axis and comprises:
      a first layer comprising first and second coplanar top electrodes which are separated from one another along the transverse axis;
      a second layer comprising a first piezoelectric element which is electrically coupled to the first and second top electrodes;
      a third layer comprising a center electrode which is electrically coupled to the first piezoelectric element;
      a fourth layer comprising a second piezoelectric element electrically coupled to the center electrode; and
      a fifth layer comprising a first bottom electrode electrically coupled to the second piezoelectric element, wherein the first and second piezoelectric elements are expandable and contractible along the longitudinal axis in response to respective electric fields applied between the center electrode and the first top electrode, the second top electrode and the first bottom electrode; and
   a load beam comprising a proximal mounting section, a flexible beam section and a micro-actuator mounting section which extends distally from the flexible beam section, wherein the flexible beam section extends from the proximal mounting section and has a preload bend with an axis of curvature that is parallel to the transverse axis, and wherein the stack comprises proximal end and a distal end and the proximal end is attached to the micro-actuator mounting section of the load beam.

11. The disc drive suspension of claim 10 wherein the load beam further comprises:
   an elongated, planar beam section, which extends from the micro-actuator mounting section to the distal end of the stack and is attached to at least one of the first through fifth layers.

12. The disc drive suspension of claim 10 wherein the load beam further comprises:
    a slider mounting element extending distally from the elongated beam section beyond the distal end of the stack.

13. The disc drive suspension of claim 10 wherein the distal end of the stack is movable relative to the proximal end along the transverse axis in response to the respective electric fields applied between the center electrode and the first top electrode and between the center electrode and the second top electrode.

14. The disc drive suspension of claim 10 wherein the distal end of the stack is movable relative to the proximal end along a vertical axis, which is perpendicular to the longitudinal and transverse axes, in response to the respective electric fields applied between the center electrode and at least one of the first and second top electrodes and between the center electrode and the first bottom electrode.

15. The disc drive suspension of claim 10 wherein the fifth layer further comprises:
    a second bottom electrode electrically coupled to the second piezoelectric element and coplanar with the first bottom electrode within the first layer, wherein the first and second bottom electrodes are separated from one another by an electrical isolation gap along the transverse axis.

16. The disc drive suspension of claim 10 wherein the center electrode comprises:
    first and second center electrodes which are coplanar with one another within the third layer and are separated from one another by an electrical isolation gap along the transverse axis.

17. A dual-acting disc drive microactuator formed of a stack of adjoining layers comprising:
    a first layer comprising first and second spaced apart top electrodes;
    a second layer comprising a first piezoelectric element electrically coupled to the first and second top electrodes;
    a third layer comprising a first center electrode electrically coupled to the first piezoelectric element and a second center electrode parallel to the first center electrode;
    a fourth layer comprising a second piezoelectric element electrically coupled to the second center electrode;
    a fifth layer comprising a first bottom electrode electrically coupled to the second piezoelectric element, wherein the first and second piezoelectric elements are expandable and contractible in a common length direction in response to respective electric fields applied between the center electrode and the first and second top electrodes and between the center electrode and the first bottom electrode; and
    a suspension beam, which is positioned between the first and second center electrodes and is elongated with the stack of adjoining layers in the length direction.

18. The dual-acting disc drive microactuator of claim 17 wherein:
    the first and second top electrodes, the first and second center electrodes and the bottom electrode are elongated in the length direction; and
    the first and second top electrodes are coplanar with one another in the first layer and are separated from one another by an electrical isolation gap in a width direction, which is perpendicular to the length direction and parallel to the first and second top electrodes.

19. The dual-acting disc drive microactuator of claim 18 wherein the stack of adjoining layers has first and second opposite ends and wherein the second end is movable relative to the first end in the width direction in response to the respective electric fields applied between the first center electrode and the first top electrode and between the first center electrode and the second top electrode.

20. The dual-acting disc drive microactuator of claim 18 wherein the stack of adjoining layers has first and second opposite ends and wherein the second end is movable relative to the first end in a vertical direction, which is perpendicular to the length and width directions, in response to the respective electric fields applied between the first center electrode and at least one of the first and second top electrodes and between the second center electrode and the first bottom electrode.

21. The dual-acting disc drive microactuator of claim 17 wherein the fifth layer further comprises:
    a second bottom electrode electrically coupled to the second piezoelectric element and coplanar with the first bottom electrode within the fifth layer, wherein the first and second bottom electrodes are separated from one another by an electrical isolation gap in a width direction, which is perpendicular to the length direction and parallel to the first and second bottom electrodes.

22. The dual-acting disc drive microactuator of claim 17 wherein the first and second piezoelectric elements have widths measured in a width direction that is perpendicular to the length direction and parallel to the first through fifth layers, and wherein the suspension beam has a width measured in the width direction that is less than the widths of the first and second piezoelectric elements.

23. The dual-acting disc drive microactuator of claim 17 wherein the first and second piezoelectric elements are each multi-layer piezoelectric elements.

24. The dual-acting disc drive microactuator of claim 17 wherein the first piezoelectric element comprises:
    first and second elongated piezoelectric beams that are separated from one another in a width direction, which is perpendicular to the length direction and parallel to the first and second top electrodes, wherein the first top electrode is electrically coupled to the first piezoelectric beam and the second top electrode is electrically coupled to the second piezoelectric beam.

* * * * *